（12）United States Patent
Zhang et al.

(10) Patent No.: US 12,425,984 B2
(45) Date of Patent: Sep. 23, 2025

(54) DYNAMIC TRANSMISSION POWER BACKOFF

(71) Applicant: Apple Inc., Cupertino, CA (US)

(72) Inventors: Lijie Zhang, Beijing (CN); Hailong Yang, San Francisco, CA (US); Kexin Ma, San Diego, CA (US); Alex Yee Kit Ho, San Jose, CA (US); Feng Zhang, Sr., Beijing (CN); Bing Zhao, Beijing (CN); Ying Zhang, Beijing (CN); Zhiwei Wang, Beijing (CN); Qiang Miao, Beijing (CN)

(73) Assignee: Apple Inc., Cupertino, CA (US)

( * ) Notice: Subject to any disclaimer, the term of this patent is extended or adjusted under 35 U.S.C. 154(b) by 393 days.

(21) Appl. No.: 17/839,684

(22) Filed: Jun. 14, 2022

(65) Prior Publication Data

US 2023/0074893 A1 Mar. 9, 2023

Related U.S. Application Data

(60) Provisional application No. 63/242,169, filed on Sep. 9, 2021.

(51) Int. Cl.
*H04W 52/00* (2009.01)
*H04W 52/36* (2009.01)
*H04W 72/23* (2023.01)

(52) U.S. Cl.
CPC ......... *H04W 52/367* (2013.01); *H04W 72/23* (2023.01)

(58) Field of Classification Search
CPC ....... H04L 27/34; H04L 5/001; H04L 5/0053; H04L 5/0092; H04W 52/146; H04W 52/367; H04W 72/23

USPC .......................................................... 455/142
See application file for complete search history.

(56) References Cited

U.S. PATENT DOCUMENTS

| | | | | |
|---|---|---|---|---|
| 2009/0191910 A1* | 7/2009 | Athalye | .............. | H04W 52/243 455/522 |
| 2012/0113834 A1* | 5/2012 | Hunzinger | ......... | H04B 7/15535 370/252 |
| 2013/0003627 A1* | 1/2013 | Kravtsov | .......... | H04W 52/0209 370/311 |
| 2018/0098292 A1* | 4/2018 | Gulati | ................. | H04W 52/283 |

(Continued)

FOREIGN PATENT DOCUMENTS

EP 3509236 B1 6/2021

*Primary Examiner* — Md K Talukder
(74) *Attorney, Agent, or Firm* — FLETCHER YODER PC (57) ABSTRACT

An electronic device receives an indication of a number of physical resource blocks and subcarrier spacing of at least a portion of a transmission channel and determines a dynamic transmission bandwidth, or receives an indication of a modulation coding scheme of the transmission channel and determines a modulation order. The electronic device transmits, using a transmitter, a signal over at least the portion of the transmission channel based on the dynamic transmission bandwidth being less than or equal to a threshold bandwidth, or the modulation order not corresponding to an additional power backoff, using a first power based on a maximum output power capacity of the electronic device and a maximum power reduction. Otherwise, the electronic device transmits the signal over at least the portion of the transmission channel at a second power based on the maximum output power capacity, the maximum power reduction and the additional power backoff.

20 Claims, 5 Drawing Sheets

(56) References Cited

U.S. PATENT DOCUMENTS

| | | | |
|---|---|---|---|
| 2019/0208510 A1* | 7/2019 | Park | H04W 52/34 |
| 2021/0203467 A1 | 7/2021 | Guo | |
| 2021/0377861 A1* | 12/2021 | Ang | H04W 72/23 |
| 2022/0046588 A1 | 2/2022 | Yeo | |
| 2022/0201689 A1* | 6/2022 | Hosseini | H04W 80/02 |
| 2022/0312342 A1* | 9/2022 | Cha | H04W 52/325 |
| 2023/0074893 A1* | 3/2023 | Zhang | H04W 52/146 |

* cited by examiner

DYNAMIC TRANSMISSION POWER BACKOFF

CROSS-REFERENCE TO RELATED APPLICATIONS

This application claims priority to U.S. Provisional Application No. 63/242,169, filed Sep. 9, 2021, entitled "DYNAMIC TRANSMISSION POWER BACKOFF," the disclosure of which is incorporated by reference in its entirety for all purposes.

BACKGROUND

The present disclosure relates generally to wireless communication, and more specifically to efficiently transmitting wireless signals.

In an electronic device, a transmitter may include one or more amplifiers (e.g., a power amplifier) that increase a power of a transmission signal sent on a frequency range to ensure that a recipient receives the transmission signal with sufficient signal quality and power. To prevent the transmission signal from interfering with other signals on other frequencies outside the frequency range, the electronic device may decrease the power gained from the one or more amplifiers by causing the one or more amplifiers to apply a power backoff. However, in some cases, the power backoff may be excessive, and, as a result, the transmission signal may be sent with decreased power.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a method includes receiving, at a receiver of user equipment, an indication of a number of physical resource blocks and subcarrier spacing of at least a portion of a transmission channel. The method also includes receiving, by the user equipment, a dynamic transmission bandwidth of at least the portion of the transmission channel based on the number of physical resource blocks and the subcarrier spacing. The method further includes transmitting, by a transmitter of the user equipment, over at least the portion of the transmission channel based on the dynamic transmission bandwidth being less than or equal to a threshold bandwidth using a power based on a maximum output power capacity of the user equipment and a maximum power reduction.

In another embodiment, one or more tangible, non-transitory, computer-readable media, stores instructions that cause one or more processors to receive an indication of a modulation coding scheme, and transmit, by a transmitter of user equipment, a signal based on the modulation coding scheme indicating a first modulation order using a first power based on a maximum output power capacity of the user equipment and a maximum power reduction. The instructions also cause the one or more processors to transmit, by the transmitter, the signal based on the modulation coding scheme indicating a second modulation order using a second power based on the maximum output power capacity of the user equipment, the maximum power reduction, and an additional power backoff.

In yet another embodiment, an electronic device includes a receiver, a transmitter, and processing circuitry coupled to the receiver and the transmitter. The processing circuitry causes the receiver to receive an indication of a number of physical resource blocks and subcarrier spacing of at least a portion of a transmission channel, receives a dynamic transmission bandwidth of at least the portion of the transmission channel based on the number of physical resource blocks and the subcarrier spacing, and causes the transmitter to transmit a signal over at least the portion of the transmission channel based on the dynamic transmission bandwidth being less than or equal to a threshold bandwidth using a power based on a maximum output power capacity of the user equipment and a maximum power reduction.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on.

In an electronic device, a transmitter may include one or more amplifiers (e.g., a power amplifier) that increase a power of a transmission signal sent on a frequency range to ensure that a recipient receives the transmission signal with sufficient signal quality and power. The one or more amplifiers may include at least a linear amplifier, which may produce an output signal that is an accurate copy of the input signal at increased power levels for a linear region. That is, for a certain range of input power of the input signal, the amplifier may produce an output signal that is an accurate copy of the input signal having an output power that is greater than the input signal. However, outside of this linear region (e.g., in a nonlinear region), the amplifier may produce an output signal that is not an accurate copy of the input signal. When operating outside of this linear region, the output signal that is not an accurate copy of the input signal may cause emissions (e.g., spurious emissions) that are outside of the frequency range. These emissions may interfere with other signals that are outside of the frequency range. To prevent the transmission signal from interfering with these other signals on outside of the frequency range, the electronic device may decrease the power gained from the amplifier by causing the one or more amplifiers to apply a power backoff. However, in some cases, the power backoff may be excessive, and, as a result, the transmission signal may be sent with decreased power.

Embodiments herein provide various apparatuses and techniques to efficiently transmit wireless signals at an increased transmission power with decreased interference to signals outside of a desired frequency range. In some cases, applying the additional power backoff may not be necessary for smaller dynamic transmission bandwidths. For example, for a relatively low-band power amplifier (e.g., amplifying an input signal having a baseband frequency), the power amplifier may operate in a linear range for a smaller or more limited bandwidth (e.g., compared to that of a relatively high-band power amplifier). Thus, for greater bandwidths (e.g., greater than 20 megahertz (MHz)), applying the power backoff may facilitate operating the power amplifier in the linear region, but, for smaller bandwidths (e.g., less than or equal to 20 MHz), this may not be necessary as the power amplifier may operate in the linear region without applying the additional power backoff.

As such, at least some of the embodiments disclosed herein include an electronic device that receives, at a receiver, an indication of a number of physical resource blocks and subcarrier spacing (e.g., of a transmission channel, of a bandwidth part of the transmission channel, or the like). The electronic device determines a dynamic transmission bandwidth (e.g., of a dynamically allocated portion or bandwidth part (BWP) of a dynamically allocated channel) based on the number of physical resource blocks and the subcarrier spacing. The electronic device transmits, using a transmitter, a signal over the BWP based on the dynamic transmission bandwidth being less than or equal to a threshold bandwidth using first power that is based on a maximum output power capacity of the electronic device and a maximum power reduction (e.g., a first difference between the maximum output power capacity of the electronic device and the maximum power reduction). The electronic device transmits, using the transmitter, the signal over the BWP based on the dynamic transmission bandwidth being greater than the threshold bandwidth using a second power that is based on the maximum output power capacity of the electronic device, the maximum power reduction, and an additional power backoff (e.g., a second difference between the maximum output power capacity of the electronic device and a sum of the maximum power reduction and the additional power backoff). That is, in the case of the dynamic transmission bandwidth being less than or equal to a threshold bandwidth, the electronic device may not apply the additional power backoff when transmitting the signal. In this manner, greater transmission power may be used when transmitting the signal when the dynamic transmission bandwidth is less than or equal to a threshold bandwidth compared to electronic devices that apply a static or fixed additional power backoff more or all transmissions over the BWP.

Additionally or alternatively, applying the additional power backoff may not be necessary for lower modulation orders. In particular, higher modulation orders may extend a non-linear range of a power amplifier. As such, at least some of the embodiments disclosed herein include an electronic device that receives, at a receiver, an indication of a modulation coding scheme (e.g., of a transmission channel). The electronic device determines a modulation order based on the modulation coding scheme. The electronic device transmits, using a transmitter, a signal over the transmission channel based on the modulation order being a lower modulation order using a first power that is based on a maximum output power capacity of the electronic device and a maximum power reduction (e.g., a first difference between the maximum output power capacity of the electronic device and the maximum power reduction). The electronic device transmits, using the transmitter, the signal over the transmission channel based on the modulation order being a higher modulation order (e.g., higher than the lower modulation order) using a second power that is based on the maximum output power capacity of the electronic device, the maximum power reduction and an additional power backoff (e.g., a second difference between the maximum output power capacity of the electronic device and a sum of the maximum power reduction and the additional power backoff). That is, in the case of the lower modulation order, the electronic device may not apply the additional power backoff when transmitting the signal. In this manner, greater transmission power may be used when transmitting the signal when the modulation order of the transmission channel is lower compared to electronic devices that apply a static or fixed additional power backoff more or all transmissions over the transmission channel.

Figure 1:
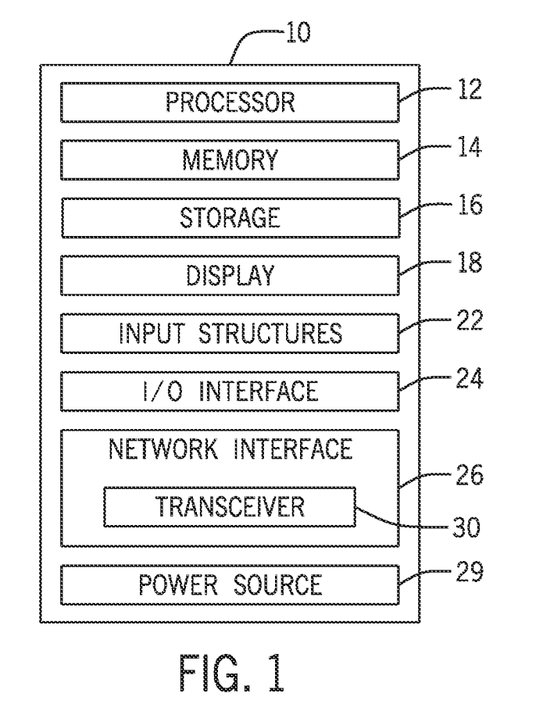
FIG. 1 is a block diagram of an electronic device, according to embodiments of the present disclosure.

FIG. 1 is a block diagram of an electronic device 10, according to embodiments of the present disclosure. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in electronic device 10.

By way of example, the electronic device 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be generally referred to herein as "data processing circuitry." Such data processing circuitry may be embodied wholly or in part as software, hardware, or both. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as an ultra-wideband (UWB) or a BLUETOOTH® network, for a local area network (LAN) or wireless local area network (WLAN), such as a network employing one of the IEEE 802.11x family of protocols (e.g., WI-FI®), and/or for a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, a satellite network, and so on. In particular, the network interface 26 may include, for example, one or more interfaces for using a Release-15 cellular communication standard of the 5G specifications that include the millimeter wave (mmWave) frequency range (e.g., 24.25-300 gigahertz (GHz)) and/or any other cellular communication standard release (e.g., Release-16, Release-17, any future releases) that define and/or enable frequency ranges used for wireless communication. The network interface 26 of the electronic device 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30. In some embodiments, all or portions of the transceiver 30 may be disposed within the processor 12. The transceiver 30 may support transmission and receipt of various wireless signals via one or more antennas, and thus may include a transmitter and a receiver. The power source 29 of the electronic device 10 may include any suitable source of power, such as a rechargeable lithium polymer (Li-poly) battery and/or an alternating current (AC) power converter.

Figure 2:
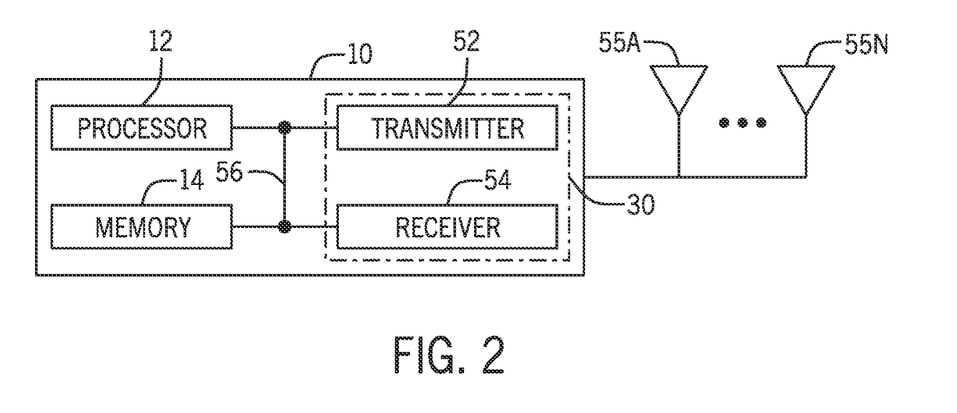
FIG. 2 is a functional diagram of the electronic device of FIG. 1, according to embodiments of the present disclosure.

FIG. 2 is a functional diagram of the electronic device 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive data between one another.

The electronic device 10 may include the transmitter 52 and/or the receiver 54 that respectively enable transmission and reception of data between the electronic device 10 and an external device via, for example, a network (e.g., including base stations) or a direct connection. As illustrated, the transmitter 52 and the receiver 54 may be combined into the transceiver 30. The electronic device 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with a one or more beams and various configurations. In some embodiments, multiple antennas of the antennas 55A-55N of an antenna group or module may be communicatively coupled a respective transceiver 30 and each emit radio frequency signals that may constructively and/or destructively combine to form a beam. The electronic device 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means.

As illustrated, the various components of the electronic device 10 may be coupled together by a bus system 56. The bus system 56 may include a data bus, for example, as well as a power bus, a control signal bus, and a status signal bus, in addition to the data bus. The components of the electronic device 10 may be coupled together or accept or provide inputs to each other using some other mechanism.

Figure 3:
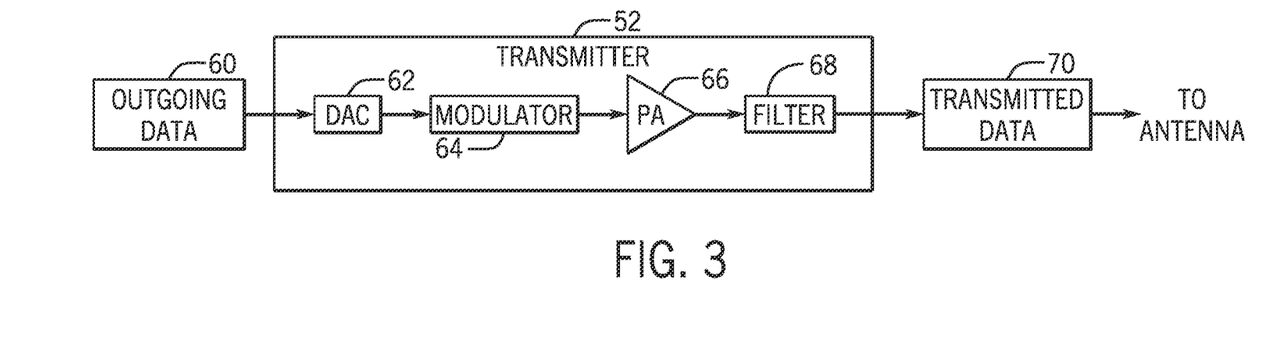
FIG. 3 is a schematic diagram of a transmitter of the electronic device of FIG. 1, according to embodiments of the present disclosure.

FIG. 3 is a schematic diagram of the transmitter 52 (e.g., transmit circuitry), according to embodiments of the present disclosure. As illustrated, the transmitter 52 may receive outgoing data 60 in the form of a digital signal to be transmitted via the one or more antennas 55. A digital-to-analog converter (DAC) 62 of the transmitter 52 may convert the digital signal to an analog signal, and a modulator 64 may combine the converted analog signal with a carrier signal to generate a radio wave. A power amplifier (PA) 66 receives the modulated signal from the modulator 64. The power amplifier 66 may amplify the modulated signal to a suitable level to drive transmission of the signal via the one or more antennas 55. A filter 68 (e.g., filter circuitry and/or software) of the transmitter 52 may then remove undesirable noise from the amplified signal to generate transmitted data 70 to be transmitted via the one or more antennas 55. The filter 68 may include any suitable filter or filters to remove the undesirable noise from the amplified signal, such as a bandpass filter, a bandstop filter, a low pass filter, a high pass filter, and/or a decimation filter. Additionally, the transmitter 52 may include any suitable additional components not shown, or may not include certain of the illustrated components, such that the transmitter 52 may transmit the outgoing data 60 via the one or more antennas 55. For example, the transmitter 52 may include a mixer and/or a digital up converter. As another example, the transmitter 52 may not include the filter 68 if the power amplifier 66 outputs the amplified signal in or approximately in a desired frequency range (such that filtering of the amplified signal may be unnecessary).

Figure 4:
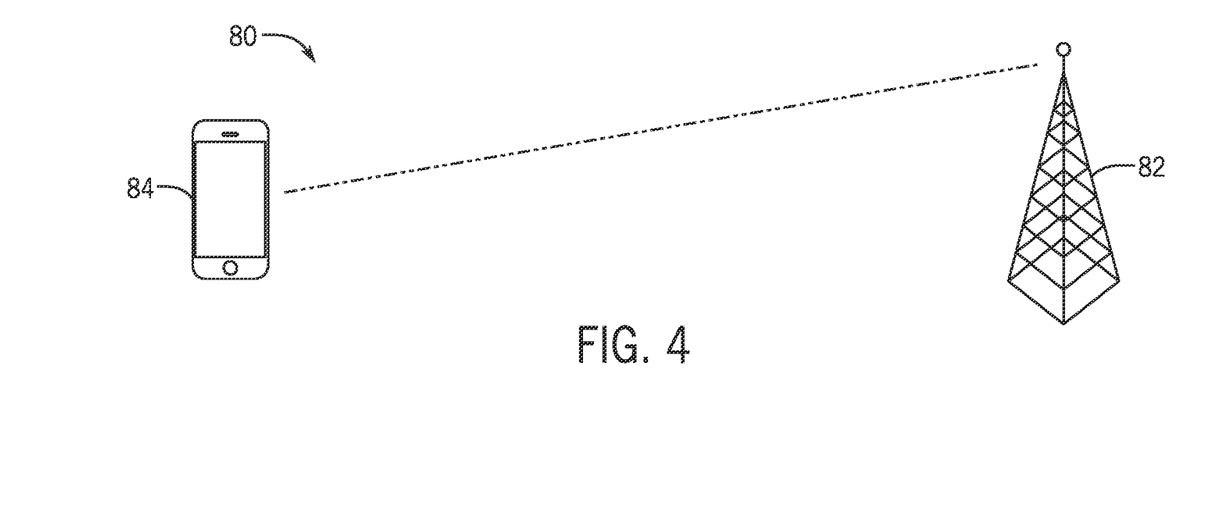
FIG. 4 is a schematic diagram of a wireless communication network supported by a base station and communicatively coupled to user equipment, which may include the electronic device of FIG. 1, according to an embodiment of the present disclosure.

FIG. 4 is a schematic diagram illustrating a wireless communication network 80 support by a base station 82 and communicatively coupled to user equipment 84, according to embodiments of the present disclosure. In particular, the base station 82 (e.g., a Next Generation NodeB (gNodeB or gNB) base station) may provide 5G/New Radio (NR) coverage via the wireless communication network 80. Each of the user equipment 84 and the base station 82 may include at least some of the components of the electronic device 10 shown in FIG. 1 and FIG. 2, including one or more processors 12, the memory 14, the storage 16, the transmitter 52, the receiver 54, and the associated circuitry shown in FIG. 3. It should be understood that while the present disclosure uses 5G NR as an example specification or standard, the embodiments disclosed herein may apply to other specifications or standards (e.g., such as the 4G LTE specification).

Figure 5:
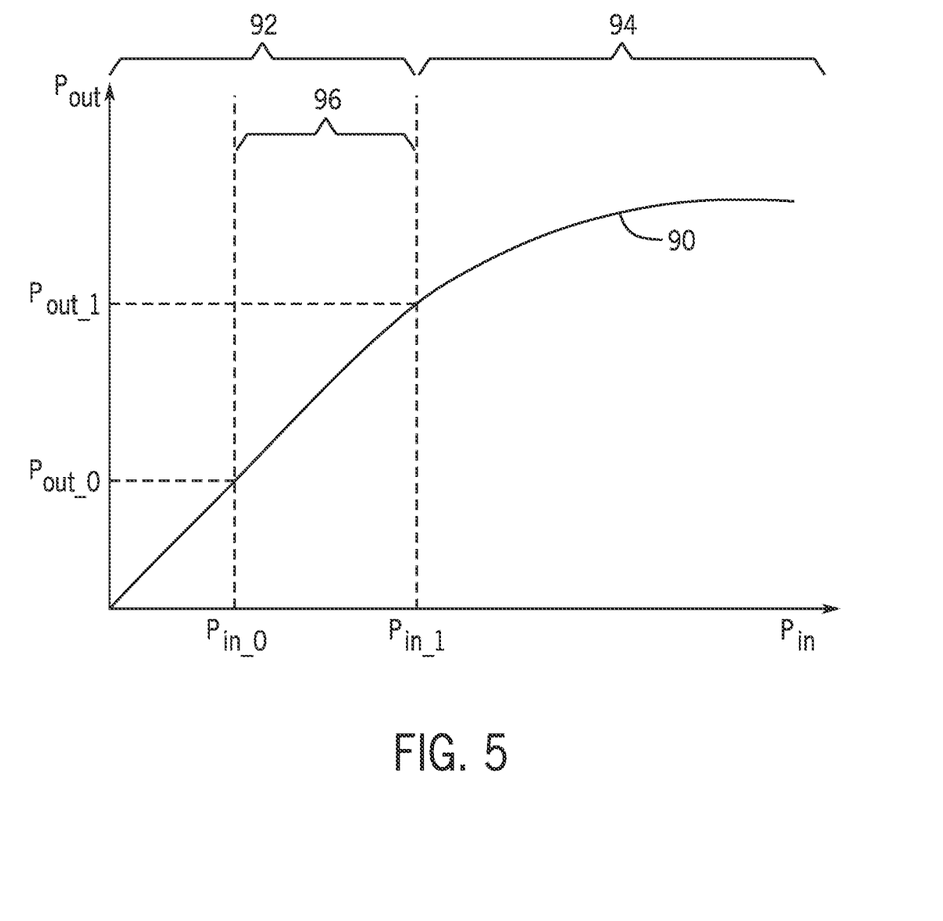
FIG. 5 is a plot illustrating a power curve or amplification factor describing operation of a power amplifier of the transmitter of FIG. 3, according to embodiments of the present disclosure.

As discussed above, the power amplifier 66, or any other amplifier that may be included in the transmitter 52, may increase a power of a transmission signal sent on a frequency range (e.g., of a transmission channel, of a bandwidth part of the transmission channel, or the like) to ensure that a recipient receives the transmission signal with sufficient signal quality and power. In some embodiments, the power amplifier 66 may include a linear amplifier, which may produce an output signal that is an accurate copy of the input signal at increased power levels for a linear region. FIG. 5 is a plot illustrating a power curve or amplification factor (e.g., $P_{out}/P_{in}$) 90 describing operation of the power amplifier 66, according to embodiments of the present disclosure. The horizontal or x-axis of the plot represents input power ($P_{in}$) of an input signal of the power amplifier 66, and the vertical or y-axis of the plot represents output power ($P_{out}$) of an output signal of the power amplifier 66, where the power of the output signal has been amplified by the power amplifier 66. As illustrated, for a certain range of input power of the input signal, referred to as the linear region 92, the relationship between $P_{in}$ and $P_{out}$ is approximately linear (such that the output signal is an accurate copy of the input signal having an output power that is greater than the input signal). However, outside of the linear region 92, in a nonlinear region 94 where the relationship between $P_{in}$ and $P_{out}$ is no longer approximately linear, the power amplifier 66 may no longer produce an output signal that is an accurate copy of the input signal. Indeed, the amplification factor 90 of the power amplifier 66 may decrease. Moreover, when operating in the nonlinear region 94, the output signal may cause emissions (e.g., spurious emissions) outside of the frequency range that the transmitter 52 sends the transmission signal. These emissions may interfere with other signals that are outside of the frequency range.

To prevent the transmission signal from interfering with these other signals outside of the frequency range, the processor 12 may decrease the power gained from the power amplifier 66 by causing the power amplifier 66 to apply a power backoff. For example, the processor 12 may decrease the input power of the input signal to the power amplifier 66, adjust bias voltages or currents of the power amplifier 66 to decrease the amplification factor 90, and so on. However, in some cases, the power backoff may be excessive, and, as a result, the transmission signal may be sent with decreased power. For example, as illustrated in FIG. 5, the processor 12 may cause the power amplifier 66 to apply a power backoff such that an input signal having an input power $P_{in\_0}$ is received by the power amplifier 66, which amplifies the input signal and generates an output signal having an output power $P_{out\_0}$. But more transmission power may be realized (e.g., with reduced or minimal interference with other signals outside of the frequency range) if the applied power backoff were less, such that an input signal having an input power $P_{in\_1}$ received by the power amplifier 66 would be amplified by the power amplifier 66 to generate an output signal having an output power $P_{out\_1}$. This difference in amplification factor 90 (or input power $P_{in\_1} - P_{in\_0}$) may be referred to as headroom 96 (e.g., a buffer between a first input power, such as $P_{in\_0}$, and a second input power, such as $P_{in\_1}$, that causes the power amplifier 66 to enter the nonlinear region 94). In some cases, the headroom 96 is provided to account for factors that may affect (e.g., increase) the amplification factor 90, such that it would cause the power amplifier 66 to undesirably operate in the nonlinear region 94, such as changes in temperature, voltage standing wave ratio, manufacturing, process variation, real-world imperfections, different beam configurations, and so on.

Embodiments herein provide various apparatuses and techniques to efficiently transmit signals by dynamically applying at least a portion of the power backoff, thus enabling greater transmission power while preventing the transmission signal from interfering with other signals outside of the transmission frequency range. In particular, the user equipment 84 may transmit a signal using a range of transmission power, up to a maximum output power capacity of the user equipment 84. The user equipment 84 may also define a maximum transmission power level (MTPL) as a difference between the maximum output power capacity and a maximum power reduction (MPR). The MPR may include a regulatory power reduction that meets regulatory requirements related to radio frequency radiation or emission (e.g., by the Federal Communications Commission or another regulatory entity), to ensure that the power amplifier 66 does not enter the nonlinear region 94 illustrated in FIG. 5 (and thus cause spurious emissions that increase radiation emitted by the transmitter 52). The MPR may vary with modulation order and/or resource block (RB) allocation of a frequency channel allocated by a network (e.g., 80) as sent by a base station (e.g., 82) of the network. For example, for a channel with a higher modulation order, the MPR may be greater. Similarly, for a channel with a resource block allocation nearer an edge of the channel (e.g., closer to a neighboring channel or frequency outside the channel), the MPR may be greater (e.g., to prevent spurious emissions resulting from transmitting a signal on the channel from interfering with signals communicated on the neighboring channel or the frequencies outside the channel). The user equipment 84 may determine the MTPL at a slot level (e.g., for each slot) of a subframe of, for example, a 5G NR frame.

Additionally, in some cases, the user equipment 84 may be configured to apply an additional power backoff due to channel bandwidth. For example, the user equipment 84 may apply an additional power backoff of 2 decibels for certain frequency bands, such as frequency bands Evolved Universal Terrestrial Radio Access (E-UTRA) B1 (e.g., 2100 megahertz (MHz)) having a bandwidth greater than 20 MHz, B3 (e.g., 1800 MHz) having a bandwidth greater than 20 MHz, B25 (e.g., 1900 MHz) having a bandwidth greater than 20 MHz, B28 (e.g., 700 MHz) having a bandwidth greater than 20 MHz, B66 (e.g., 1700 MHz) having a bandwidth greater than 20 MHz, and so on. As another example, the user equipment 84 may apply an additional power backoff of 1.5 decibels for certain frequency bands, such as frequency band E-UTRA B7 (e.g., 2600 MHz) having a bandwidth greater than 20 MHz. As such, in these cases, the user equipment 84 may apply a static or fixed additional power backoff when the channel bandwidth is greater than 20 MHz, such that the user equipment 84 may set the MTPL to a difference between the maximum output power capacity of the user equipment and a sum of the maximum power reduction and the additional power backoff.

However, in some embodiments, applying the additional power backoff may not be necessary for smaller dynamic transmission bandwidths of a channel. For example, for a relatively low-band power amplifier (e.g., amplifying an input signal having a baseband frequency), the power amplifier may operate in a linear range for a smaller or more limited bandwidth (e.g., compared to that of a relatively high-band power amplifier). Thus, for greater bandwidths (e.g., greater than 20 megahertz (MHz)), applying the power backoff may facilitate operating the power amplifier in the linear region, but, for smaller bandwidths (e.g., less than or equal to 20 MHz), this may not be necessary as the power amplifier may operate in the linear region without applying the additional power backoff. Moreover, dynamic transmission bandwidth may refer to a bandwidth of a portion or bandwidth part (BWP) of a channel that is dynamically allocated by the network 80 (e.g., a 5G NR network). For example, a physical layer of a 5G NR network 80 may allocate bandwidth of physical resource blocks for each slot of each subframe of each 5G NR frame.

Figure 6:
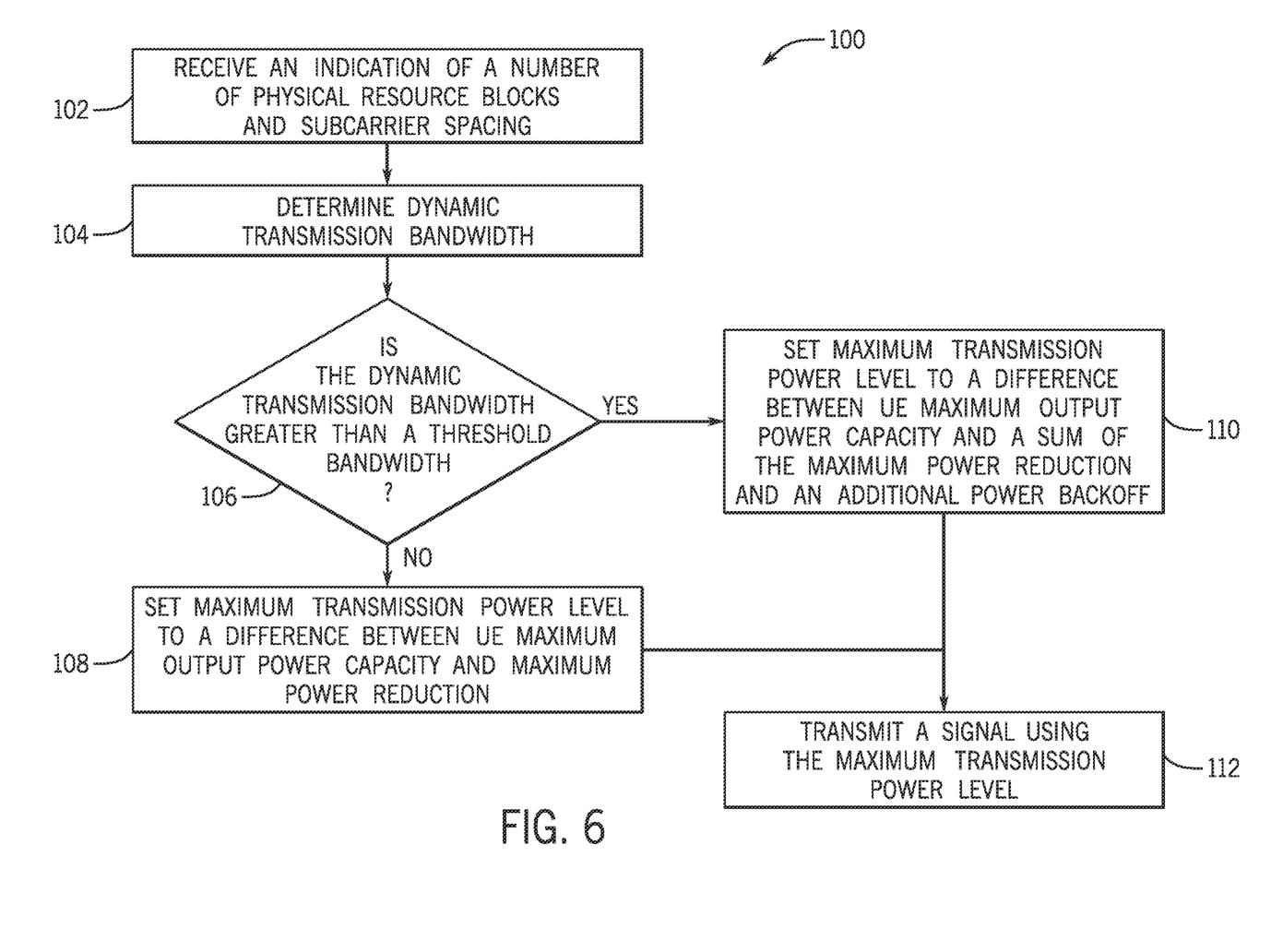
FIG. 6 is a flowchart of a method for dynamically applying an additional power backoff based on dynamic transmission bandwidth of a portion of an allocated channel, according to embodiments of the present disclosure.

FIG. 6 is a flowchart of a method 100 for dynamically applying the additional power backoff based on the dynamic transmission bandwidth, according to embodiments of the present disclosure. Any suitable device (e.g., a controller) that may control components of the user equipment 84, such as the processor 12 (e.g., a baseband processor of the user equipment 84), may perform the method 100. In some embodiments, the method 100 may be implemented by executing instructions stored in a tangible, non-transitory, computer-readable medium, such as the memory 14 or storage 16, using the processor 12. For example, the method 100 may be performed at least in part by one or more software components, such as an operating system of the user equipment 84, one or more software applications of the user equipment 84, and the like. While the method 100 is described using steps in a specific sequence, it should be understood that the present disclosure contemplates that the described steps may be performed in different sequences than the sequence illustrated, and certain described steps may be skipped or not performed altogether.

In process block 102, the processor 12 of the user equipment 84 receives an indication of a number of physical resource blocks and subcarrier spacing. In particular, the receiver 54 of the user equipment 84 may receive downlink control information (DCI) on a physical downlink control channel (PDCCH) (e.g., as defined by the 5G specification). The DCI includes information about uplink shared channel (UL-SCH) resource allocation (e.g., a set of resource blocks having the UL-SCH), transport format, information related to a UL-SCH Hybrid Automatic Repeat reQuest (ARQ), and/or other control signaling. In particular, the DCI may include the number of physical resource blocks and the subcarrier spacing for a BWP of a channel that is dynamically allocated by the 5G NR network 80.

In process block 104, the processor 12 determines or receives the dynamic transmission bandwidth (e.g., of a portion or BWP of a channel that is dynamically allocated by the 5G NR network 80) based on the number of physical resource blocks and the subcarrier spacing. That is, the network 80 may dynamically allocate different physical resource blocks for transmission in the DCI over the PDCCH for each slot (e.g., of a subframe of a frame for the allocated channel). The processor 12 may determine the dynamic transmission bandwidth by determining a product of the subcarrier spacing, the number of physical resource blocks, and a number of subcarriers in a physical resource block. The subcarrier spacing may be configured by the network 80 in the BWP configuration, and, for the 5G NR specification, may include 15 kilohertz (kHz), 30 kHz, 60 kHz, and so on. Additionally, for the 5G NR specification, the number of subcarriers in a physical resource blocks is 12. Furthermore, the network 80 may dynamically allocate the number of physical resource blocks in the DCI over the PDCCH. As such, the processor 12 may determine the dynamic transmission bandwidth by determining a product of the number of physical resource blocks, the subcarrier spacing, and the number 12.

In decision block 106, the processor 12 determines whether the dynamic transmission bandwidth is greater than a threshold bandwidth (e.g., for a respective slot of a subframe of a frame for the allocated channel). The threshold bandwidth may be any suitable bandwidth over which transmitting a signal may benefit from an additional power backoff to ensure that the transmission signal over the BWP causes decreased or minimal interference to other signals outside the BWP (such that the other signals may be received with sufficient signal quality and power). For example, the threshold bandwidth may include greater than 1 MHz, greater than 10 MHz, greater than 15 MHz, greater than 20 MHz, greater than 25 MHz, greater than 100 MHz, and so on, such as 20 MHz.

If the dynamic transmission bandwidth is less than or equal to the threshold bandwidth, then, in process block 108, the processor 12 sets the maximum transmission power level (MTPL) to a difference between a maximum output power capacity of the user equipment 84 and a maximum power reduction (MPR) (e.g., for a respective slot of a subframe of a frame for the allocated channel). If the dynamic transmission bandwidth is greater than the threshold bandwidth, then, in process block 110, the processor 12 sets the MTPL to a difference between the maximum output power capacity of the user equipment 84 and a sum of the MPR and an additional power backoff (e.g., for a respective slot of a subframe of a frame for the allocated channel). The additional power backoff may be any suitable amount of power to backoff to ensure that sending the transmission signal over the BWP causes decreased or minimal interference to other signals outside the BWP (such that the other signals may be received with sufficient signal quality and power). For example, the additional power backoff may include greater than 0 decibels (dB), greater than 0.5 dB, greater than 1 dB, greater than 1.5 dB, greater than 2 dB, greater than 5 dB, and so on, such as 2 dB.

In process block 112, the processor 12 may cause the transmitter 52 to transmit a signal (e.g., over the BWP) using the MTPL (e.g., for a respective slot of a subframe of a frame for the allocated channel) as determined in process block 108 or 110. As such, in the case of the dynamic transmission bandwidth being less than or equal to a threshold bandwidth, the user equipment 84 may not apply the additional power backoff when transmitting the signal. In this manner, greater transmission power may be used when transmitting the signal when the dynamic transmission bandwidth is less than or equal to a threshold bandwidth compared to other devices that apply a static or fixed additional power backoff more or all transmissions over the BWP.

Figure 7:
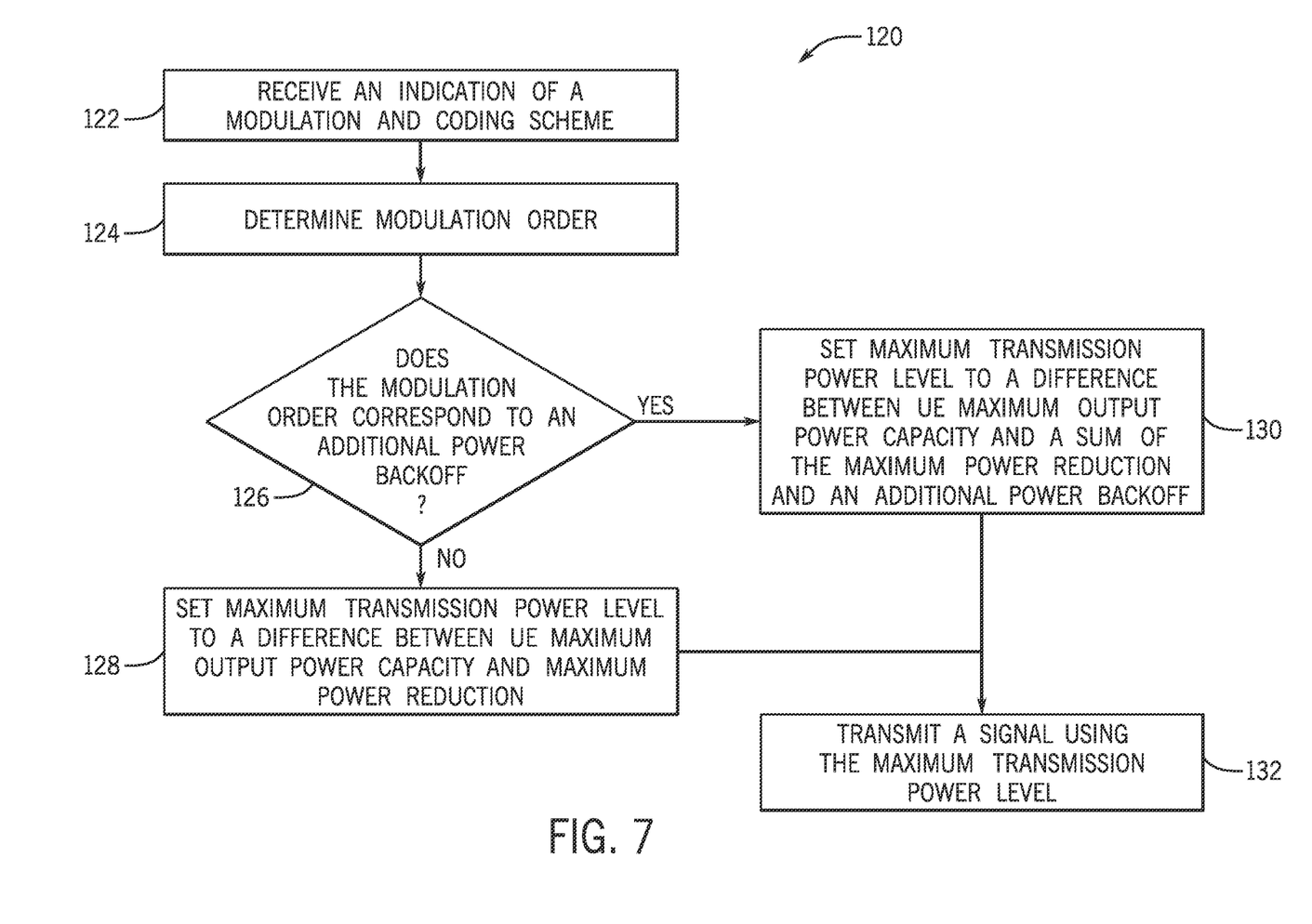
FIG. 7 is a flowchart of a method for dynamically applying the additional power backoff based on modulation order of the portion of the allocated channel, according to embodiments of the present disclosure.

Additionally or alternatively, applying the additional power backoff may not be necessary for lower modulation orders. In particular, higher modulation orders may extend a non-linear range of a power amplifier. Moreover, the network 80 (e.g., a 5G NR network) may dynamically allocate a different modulation and coding scheme (MCS) for transmission for each slot of each subframe of each 5G NR frame. For example, the MCS may correspond to different modulation orders, such as, in order of increasing modulation, quadrature phase shift keying (QPSK), 16 quadrature amplitude modulation (16 QAM), 64 quadrature amplitude modulation QAM), 256 quadrature amplitude modulation (256 QAM), and so on. FIG. 7 is a flowchart of a method 120 for dynamically applying the additional power backoff based on the modulation order, according to embodiments of the present disclosure. Any suitable device (e.g., a controller) that may control components of the user equipment 84, such as the processor 12 (e.g., a baseband processor of the user equipment 84), may perform the method 120. In some embodiments, the method 120 may be implemented by executing instructions stored in a tangible, non-transitory, computer-readable medium, such as the memory 14 or storage 16, using the processor 12. For example, the method 120 may be performed at least in part by one or more software components, such as an operating system of the user equipment 84, one or more software applications of the user equipment 84, and the like. While the method 120 is described using steps in a specific sequence, it should be understood that the present disclosure contemplates that the described steps may be performed in different sequences than the sequence illustrated, and certain described steps may be skipped or not performed altogether.

In process block 122, the processor 12 of the user equipment 84 receives an indication of a modulation and coding scheme (MCS). In particular, the receiver 54 of the user equipment 84 may receive DCI on a PDCCH (e.g., as defined by the 5G specification), which may include the MCS. In process block 124, the processor 12 determines or receives the modulation order (e.g., for a respective slot of a subframe of a frame for the allocated channel) based on the MCS. That is, the network 80 may dynamically allocate a different MCS for transmission in the DCI over the PDCCH for each slot. The MCS may indicate a modulation order, such as, in order of increasing modulation, quadrature phase shift keying (QPSK), 16 quadrature amplitude modulation (16 QAM), 64 quadrature amplitude modulation (64 QAM), 256 quadrature amplitude modulation (256 QAM), and so on.

In decision block 126, the processor 12 determines whether the modulation order corresponds to an additional power backoff. That is, the processor 12 may correlate each modulation order with a different (or same) additional power backoff. In particular, higher modulation orders (e.g., 16 QAM or higher, 64 QAM or higher, 256 QAM or higher, such as 256 QAM) may be associated with a non-zero additional power backoff (e.g., 2 dB), whereas lower modulation orders, (e.g., 64 QAM or lower, 16 QAM or lower, such as QPSK), may be associated with a zero additional backoff (e.g., 0 dB). As mentioned above, the additional power backoff may be any suitable amount of power to backoff to ensure that sending the transmission signal over the slot or the allocated channel causes decreased or minimal interference to other signals outside the slot or the allocated channel (such that the other signals may be received with sufficient signal quality and power), including greater than 0 decibels (dB), greater than 0.5 dB, greater than 1 dB, greater than 1.5 dB, greater than 2 dB, greater than 5 dB, and so on. In some embodiments, the additional power backoff for each modulation order may be determined prior to runtime (e.g., prior to delivering to a consumer), such as during a testing or performance phase of the user equipment 84. Additionally, in some embodiments, the modulation orders and whether they correspond to an additional power backoff and/or their respective power backoffs may be stored in a data structure (e.g., a table such as a lookup table) in the memory 14 or storage 16 of the user equipment 84. In such embodiments, the processor 12 may query the data structure to determine whether the modulation order corresponds to an additional power backoff.

If the modulation order does not correspond to the additional power backoff, then, in process block 128, the processor 12 sets the maximum transmission power level (MTPL) to a difference between a maximum output power capacity of the user equipment 84 and a maximum power reduction (MPR) (e.g., for a respective slot of a subframe of a frame for the allocated channel). If the modulation order does correspond to the additional power backoff, then, in process block 130, the processor 12 sets the MTPL to a difference between the maximum output power capacity of the user equipment 84 and a sum of the MPR and an additional power backoff (e.g., for a respective slot of a subframe of a frame for the allocated channel).

In process block 132, the processor 12 may cause the transmitter 52 to transmit a signal using the MTPL (e.g., for a respective slot of a subframe of a frame for the allocated channel) as determined in process block 128 or 130. As such, in the case of the modulation order not corresponding to the additional power backoff, the user equipment 84 may not apply the additional power backoff when transmitting the signal. In this manner, greater transmission power may be used when transmitting the signal when the modulation order does not correspond to an additional power backoff compared to other devices that apply a static or fixed additional power backoff to more or all transmissions over the slot or the allocated channel.

It should be understood that, in some embodiments, the methods 100 of FIG. 6 and 120 of FIG. 7 may be combined. As such, the user equipment 84 may receive an indication of the number of physical resource blocks, subcarrier spacing, and modulation and coding scheme (e.g., as described in process blocks 102 and 122), and determine the dynamic transmission bandwidth and the modulation order (e.g., as described in process blocks 104 and 124). The user equipment 84 may then set the maximum transmission power level based on the dynamic transmission bandwidth and/or the modulation order (e.g., as described in process blocks 106, 108, 110, 126, 128, and 130), and then transmit a signal using the maximum transmission power level (e.g., as described in process blocks 112 and 132).

Moreover, for the purposes of this disclosure, it should be understood that the prevention of the transmission signal to interfere with other signals outside of the desired frequency channel may refer to reduced or minimal interference by the transmission signal, such that the other signals may be received at respective receivers with sufficient signal power and quality to appropriately process the other signals (e.g., the received signal powers of the other signals are within a threshold of error compared to when the power backoff is applied, the received signal qualities of the other signals are within a threshold of error compared to when the power backoff is applied, data may be extracted from the other signals within a threshold of error, and so on).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. A method, comprising:
receiving, at a receiver of user equipment, an indication of a number of physical resource blocks and subcarrier spacing of at least a portion of a transmission channel;
receiving, by the user equipment, a dynamic transmission bandwidth of at least the portion of the transmission channel based on the number of physical resource blocks and the subcarrier spacing; and
transmitting, by a transmitter of the user equipment, a signal over at least the portion of the transmission channel based on the dynamic transmission bandwidth being greater than a threshold bandwidth using a power, the power being based on a maximum output power capacity of the user equipment, a maximum power reduction, and a power backoff associated with one or more frequency bands of the transmission channel.

2. The method of claim 1, comprising determining the power based on a difference between the maximum output power capacity of the user equipment and a sum of the maximum power reduction and the power backoff.

3. The method of claim 1, comprising transmitting, by the transmitter of the user equipment, a second signal over at least the portion of the transmission channel based on the dynamic transmission bandwidth being less than or equal to the threshold bandwidth using a second power based on the maximum output power capacity of the user equipment and the maximum power reduction.

4. The method of claim 3, comprising determining the second power based on a difference between the maximum output power capacity of the user equipment and the maximum power reduction.

5. The method of claim 1, wherein the power backoff is between 1 decibel and 3 decibels.

6. The method of claim 1, wherein the threshold bandwidth comprises 20 megahertz.

7. The method of claim 1, wherein the maximum power reduction is associated with meeting a regulatory requirement for emission by the transmitter.

8. The method of claim 1, comprising receiving, at the receiver of the user equipment, downlink control information on a physical downlink channel control channel, the downlink control information comprising the indication of the number of physical resource blocks and the subcarrier spacing.

9. The method of claim 1, wherein the portion of the transmission channel comprises a bandwidth part of the transmission channel as defined by a fifth generation cellular standard.

10. An electronic device, comprising:
a receiver;
a transmitter; and
processing circuitry coupled to the receiver and the transmitter, the processing circuitry configured to
cause the receiver to receive an indication of a number of physical resource blocks and subcarrier spacing of at least a portion of a transmission channel,
receive a dynamic transmission bandwidth of at least the portion of the transmission channel based on the number of physical resource blocks and the subcarrier spacing, and
cause the transmitter to transmit a signal over at least the portion of the transmission channel based on the dynamic transmission bandwidth being greater than a threshold bandwidth using a power, the power being based on a maximum output power capacity of the electronic device, a maximum power reduction, and a power backoff associated with a modulation order of the portion of the transmission channel.

11. The electronic device of claim 10, wherein the power comprises a difference between the maximum output power capacity of the electronic device and a sum of the maximum power reduction and the power backoff.

12. The electronic device of claim 10, wherein the processing circuitry is configured to cause the transmitter to transmit the signal over at least the portion of the transmission channel based on the dynamic transmission bandwidth less than or equal to the threshold bandwidth using a second power based on the maximum output power capacity of the electronic device and the maximum power reduction.

13. The electronic device of claim 12, wherein the second power comprises a difference between the maximum output power capacity of the electronic device and the maximum power reduction.

14. One or more tangible, non-transitory, computer-readable media, storing instructions that are configured to cause processing circuitry to:
receive, at a receiver of user equipment, an indication of a number of physical resource blocks and subcarrier spacing of at least a portion of a transmission channel;
receive, by the user equipment, a dynamic transmission bandwidth of at least the portion of the transmission channel based on the number of physical resource blocks and the subcarrier spacing; and
transmit, by a transmitter of the user equipment, a signal over at least the portion of the transmission channel based on the dynamic transmission bandwidth being greater than a threshold bandwidth using a power, the power being based on a maximum output power capacity of the user equipment, a maximum power reduction, and a power backoff based on a headroom associated with the user equipment.

15. The one or more tangible, non-transitory, computer-readable media of claim 14, wherein the instructions cause the processing circuitry to determine the power based on a difference between the maximum output power capacity of the user equipment and a sum of the maximum power reduction and the power backoff.

16. The one or more tangible, non-transitory, computer-readable media of claim 14, wherein the instructions cause the processing circuitry to transmit, by the transmitter of the user equipment, a second signal over at least the portion of the transmission channel based on the dynamic transmission bandwidth being less than or equal to the threshold bandwidth using a second power based on the maximum output power capacity of the user equipment and the maximum power reduction.

17. The one or more tangible, non-transitory, computer-readable media of claim 16, wherein the instructions cause the processing circuitry to determine the second power based on a difference between the maximum output power capacity of the user equipment and the maximum power reduction.

18. The one or more tangible, non-transitory, computer-readable media of claim 14, wherein the maximum power reduction is associated with meeting a regulatory requirement for emission by the transmitter.

19. The one or more tangible, non-transitory, computer-readable media of claim 14, wherein the instructions cause the processing circuitry to receive, at the receiver of the user equipment, downlink control information on a physical downlink channel control channel, the downlink control information comprising the indication of the number of physical resource blocks and the subcarrier spacing.

20. The one or more tangible, non-transitory, computer-readable media of claim 14, wherein the portion of the transmission channel comprises a bandwidth part of the transmission channel as defined by a fifth generation cellular standard.

* * * * *